(12) United States Patent
Hanser et al.

(10) Patent No.: US 7,380,854 B1
(45) Date of Patent: Jun. 3, 2008

(54) DEVICE FOR REMOVING WATER AND OTHER DEBRIS FROM THE ROOF OF AN EXPANDABLE ROOM ON A VEHICLE

(75) Inventors: Paul Edmund Hanser, Tipton, IA (US); Vincent Buls, Tipton, IA (US)

(73) Assignee: HWH Corporation, Moscow, IA (US)

( * ) Notice: Subject to any disclaimer, the term of this patent is extended or adjusted under 35 U.S.C. 154(b) by 360 days.

(21) Appl. No.: 11/307,374

(22) Filed: Feb. 3, 2006

(51) Int. Cl.
*B60P 3/34* (2006.01)

(52) U.S. Cl. .................. 296/26.13; 296/26.12

(58) Field of Classification Search ............. 296/26.12, 296/26.13

See application file for complete search history.

(56) References Cited

U.S. PATENT DOCUMENTS 6,840,568 B2   1/2005   Carrillo et al.

*Primary Examiner*—Lori L Lyjak
(74) *Attorney, Agent, or Firm*—Ryan N. Carter

(57) ABSTRACT

An assembly adapted to protect a vehicle with an expandable room by preventing water and debris on the roof of an expanded expandable room from being trapped or crushed between the expandable room and the body of the vehicle as the room is retracted. The assembly comprises an upper member and a lower member that mate at a pivoting connection. The upper member is attached to the outside surface of the vehicle above the expandable room. The lower member is pivotally combined with the upper member so that it hangs below the upper member and rests against the top edge of the expandable room. As the room is retracted, a spring urges a portion of the lower member to remain frictionally engaged with the roof of the expandable room so as to slide over the surface of the roof and remove water and other debris from the roof.

12 Claims, 6 Drawing Sheets

DEVICE FOR REMOVING WATER AND OTHER DEBRIS FROM THE ROOF OF AN EXPANDABLE ROOM ON A VEHICLE

BACKGROUND OF THE INVENTION

This invention relates generally to expandable rooms, and more particularly to room structures that are moveable between retracted and expanded positions. The invention particularly relates to vehicles such as recreational vehicles that are provided with one or more expandable room or room portions that are capable of moving from a retracted position to an expanded position to provide additional internal space. Typically, one portion of the room is nested within a portion of an existing room of the vehicle that remains fixed.

As is well known to those skilled in the art, when a recreational vehicle equipped with an expandable room is in motion, the room typically remains in a retracted position. This is necessary in order for the vehicle to move over the road and remain within vehicle width limitations. However, when the vehicle is stopped for a period of time, it is often desirable to increase the size of the internal accommodations, and in order to do so the user will cause the moveable portion of the room to move outwardly to an expanded position. Similarly, when it is time to move the vehicle over the road again, the user will cause the movable portion of the room to move inwardly to its retracted position.

In its expanded position, leaves, branches, rain water, and other debris may gather on the roof of the expandable room. The debris can cause damage to the recreational vehicle as the room is retracted because it can get crushed or trapped in between the recreational vehicle body and the expandable room. To prevent this from happening, awnings or cloth covers have been used over the top of the expandable rooms to prevent the water and debris from accumulating on the roof of the room. Awnings of this type are described in U.S. Pat. No. 6,840,568. There are multiple problems with these types of awnings. First, they don't always prevent the accumulation of debris because debris can still accumulate on the roof if the wind blows the debris under the sides of the awning. Further, awnings are limited in length because the longer their length, the greater the bending force on the roller support tube. In some instances the bending force may be so great that the roller tube cannot support the weight of the awning which can be dangerous, especially in high winds.

It is therefore a principal object of this invention to provide a vehicle protection assembly that prevents water and other debris on the roof of an expandable room from being trapped or crushed between the expandable room and the vehicle when the expandable room is retracted into its nested position.

SUMMARY OF THE INVENTION

The present invention is an assembly adapted to protect a vehicle having an expandable room by preventing water and other debris that gathers on the roof of the expandable room from being trapped or crushed between the expandable room and the body of the vehicle as the room is retracted. The assembly comprises an upper member and a lower member that mate at a pivoting connection. The upper member is attached to the outside surface of the vehicle above the expandable room. The lower member is pivotally combined with the upper member so that it hangs below the upper member and rests against the top edge of the expandable room.

A spring combined with the lower member urges the lower member to remain in line with the upper member. As the room is retracted, the spring urges a portion of the lower member to remain frictionally engaged with the roof of the expandable room so as to slide over the surface of the roof and push water and other debris off of the roof. The roof of the expandable room does not have a flange around its outer periphery so that the water and other debris are pushed off of the roof as the room becomes fully retracted. The assembly may comprise squeegee members which serve to seal out air and moisture. The squeegee members also may assist the lower member in removing the water and other debris from the roof as the room is retracted. As with the lower member, a portion of the squeegee members are frictionally engaged with the roof of the expandable room to squeegee the water and other debris from the roof as the room is retracted.

The protective assembly of the present invention is advantageous over the prior art because it prevents water and debris from being trapped between the body of the vehicle and the expandable room without the need for an awning. Further, the assembly prevents water and debris from being trapped between the vehicle body and the expandable room regardless of how the debris got onto the roof.

DESCRIPTION OF THE PREFERRED EMBODIMENTS OF THE INVENTION

The present invention is an assembly adapted to protect a recreational vehicle 10 by preventing leaves, branches, rain water, and other such debris that gathers on the roof 50 of an expandable room 12 from being trapped or crushed between the expandable room 12 and the body of the recreational vehicle 10 as the room 12 is retracted. Although the present invention is described herein with reference to a recreational vehicle 10, it should be noted that the present invention can be used with any suitable vehicle having an expandable room 12 such as a mobile command center, mobile medical unit, or a mobile air quality lab.

Figure 1:
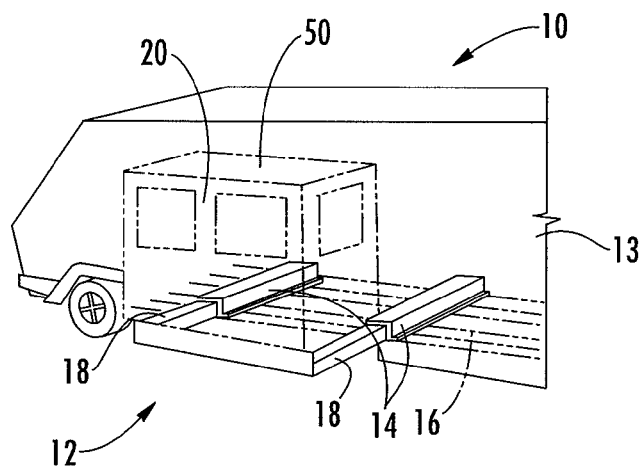
FIG. 1 is a schematic perspective view to illustrate generally an expandable room combined with a vehicle.

Referring first to FIG. 1, there is illustrated a recreational vehicle 10 having an expandable and retractable room 12 moveable into and out from one side 13 of the recreational vehicle 10. As is well known to those skilled in the art, there are a variety of systems and mechanisms for moving the room 12, and FIG. 1 illustrates a typical structure that includes beams 14 which extend laterally and are supported by the frame 16 of the recreational vehicle 10. The expandable room 12 has structural supports 18 that are supported by and move relative to the beams 14 on the recreational vehicle. In FIG. 1, the expandable room 12 is shown in an expanded position with the outside wall 20 spaced from the side wall 13 of the recreational vehicle 10.

Figure 2:
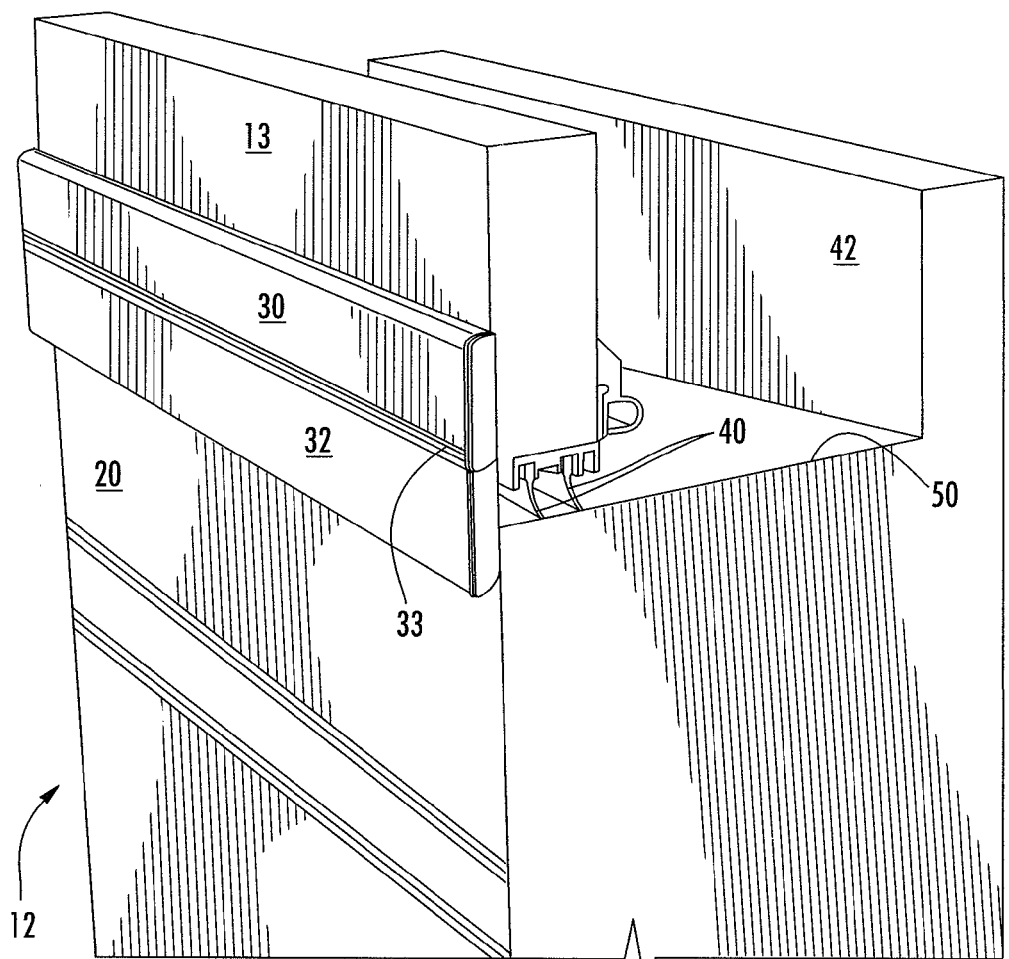
FIG. 2 is a perspective view showing the expandable room in a retracted position and the protection apparatus of the present invention combined with the external surface of the recreational vehicle.
Figure 3:
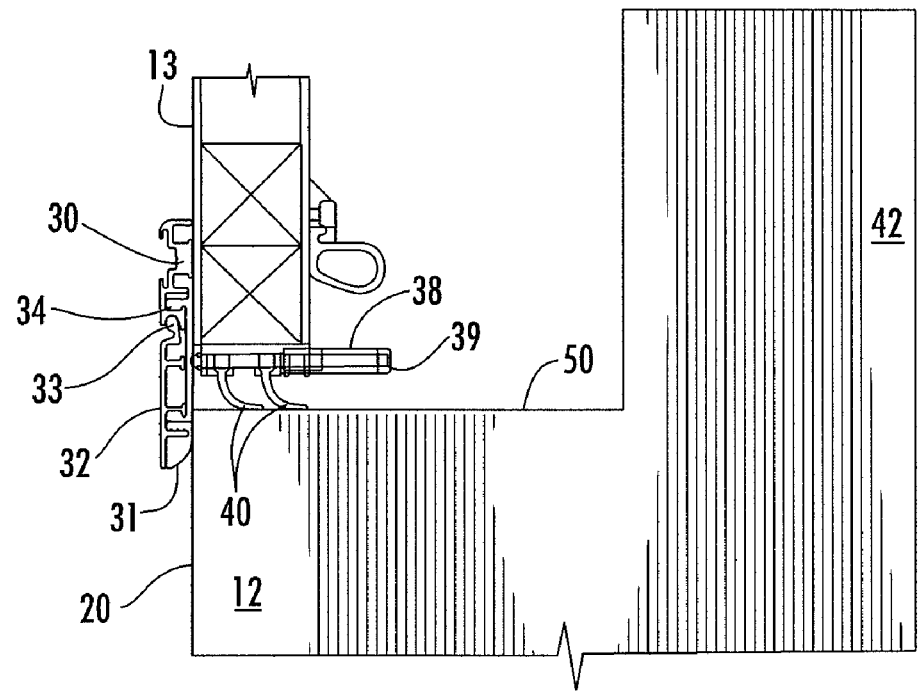
FIG. 3 is side schematic view showing the expandable room and the apparatus of the present invention wherein the room is in the retracted position.
Figure 4:
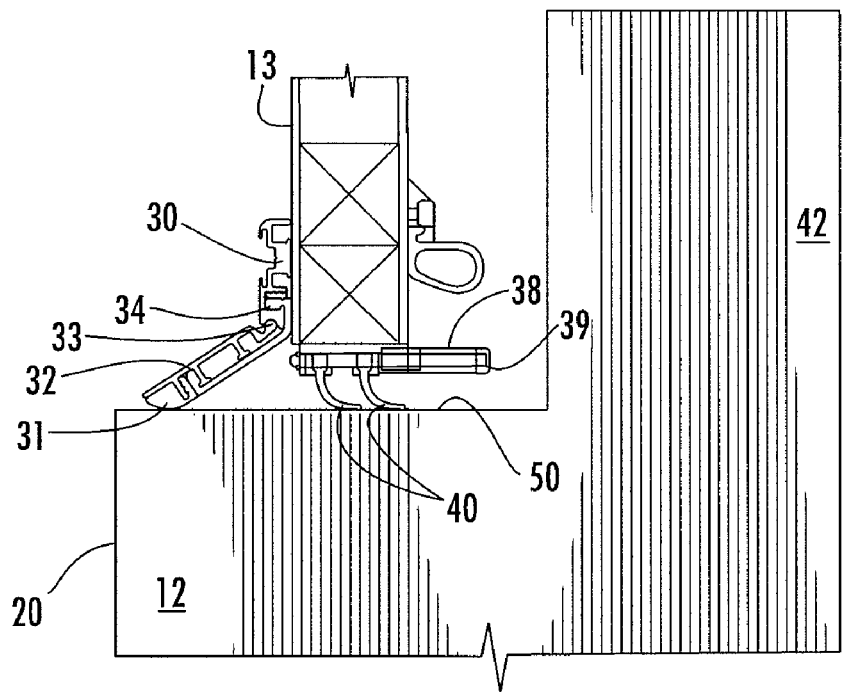
FIG. 4 is a side schematic view showing the expandable room and the apparatus of the present invention as the room is being retracted.

FIGS. 2 and 3 show the expandable room 12 in its retracted position with the assembly of the present invention combined thereto. The assembly of the present invention comprises an upper member 30 and a lower member 32 that mate at a pivoting connection 33. The upper member 30 is attached to the outside surface 13 of the recreational vehicle 10 above the expandable room 12. The lower member 32 is pivotally combined with the upper member 30 so that it extends below the upper member 30 and rests against the outer surface 20 of the expandable room 12. As best seen in FIG. 3, the lower member 32 is preferably positioned so that it extends slightly below the gap between the recreational vehicle 10 outside surface 13 and the expandable room 12 outside surface 20 when the room 12 is in its retracted position. This is so that as the room 12 extends and retracts, the lower member 32 is able to remain in contact with the roof 50 of the room 12 as shown in FIG. 4. As shown in FIGS. 2 and 3, the upper and lower members 30, 32 extend slightly outward from the plane of the recreational vehicle's 10 outside surface 13; however, it should be noted that members 30, 32 can be combined with the recreational vehicle 10 so that they are flush with the outside surface 13 when the room 12 is in the retracted position.

As shown in FIGS. 3-5, and 8 the assembly further comprises a spring 34 which acts to tension the lower member 32 by exerting a force that attempts to keep the two members 30, 32 flat in nature. In the preferred embodiment best seen in FIG. 8, the spring 34 is a rubber element which is secured to both the upper and lower members 30, 32. The spring 34 preferably keeps the two members 30, 32 joined by compressing them at a pivot joint 33.

Figure 8:
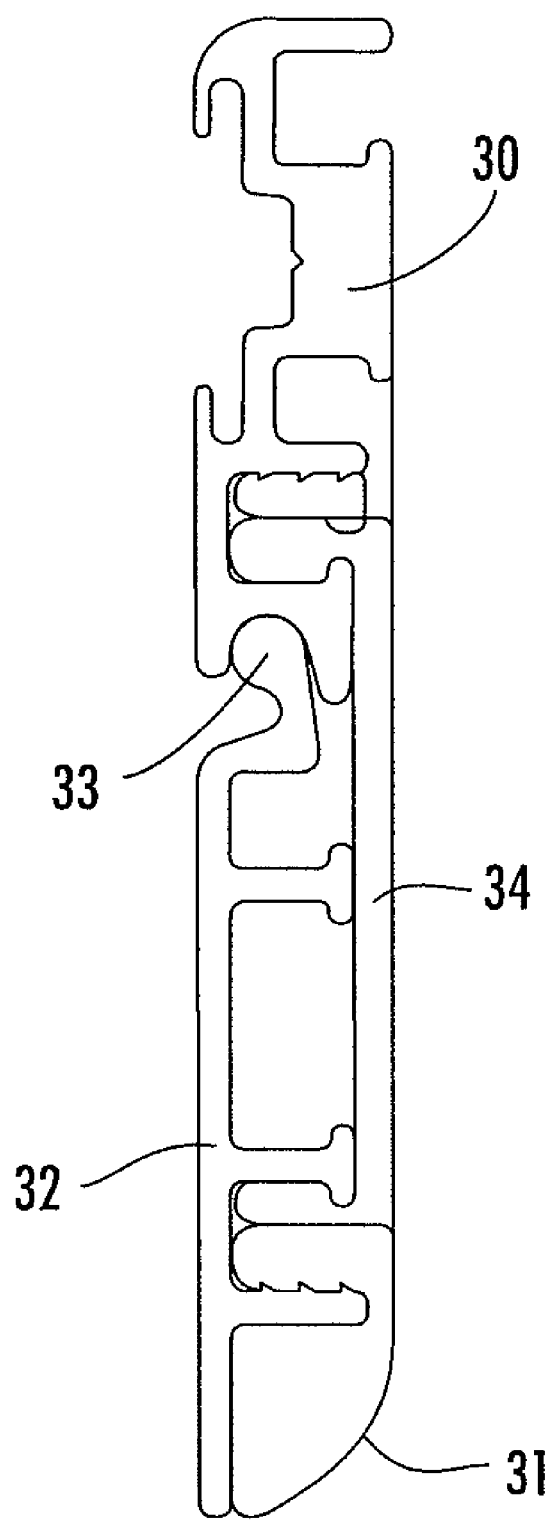
FIG. 8 is a side view of the upper and lower member combined with a spring member.

FIG. 4 shows the room 12 as it is being retracted. The lower member 32 pivots relative to the upper member 30 at pivotal connection 33 during expansion or retraction due to the lower member's 32 contact with the roof 50 of the room 12. As the room 12 is expanded and retracted, the spring 34 urges the lower member 32 to remain frictionally engaged with the roof 50 of the expandable room 12 so that lower member 32 slides over the surface of the roof 50. As best seen in FIG. 8, the lower portion 31 of the lower member 32 is preferably rounded to reduce friction as it engages the roof 50 and to ensure that the lower member 32 contacts the roof 50 of the expandable room 12 even though the position of the lower member 32 relative to the room 12 may change slightly. As the room 12 is retracted, the frictional engagement of the lower member 32 with the roof 50 serves to remove water and other debris from the roof 50 by pushing the debris off of the edge of the roof 50. It is important to note that the expandable room 12 used with this apparatus should not have a flange around the outside of its upper periphery so as to allow the water and other debris to be pushed off of the roof 50 as the room 12 becomes fully retracted.

Figure 5:
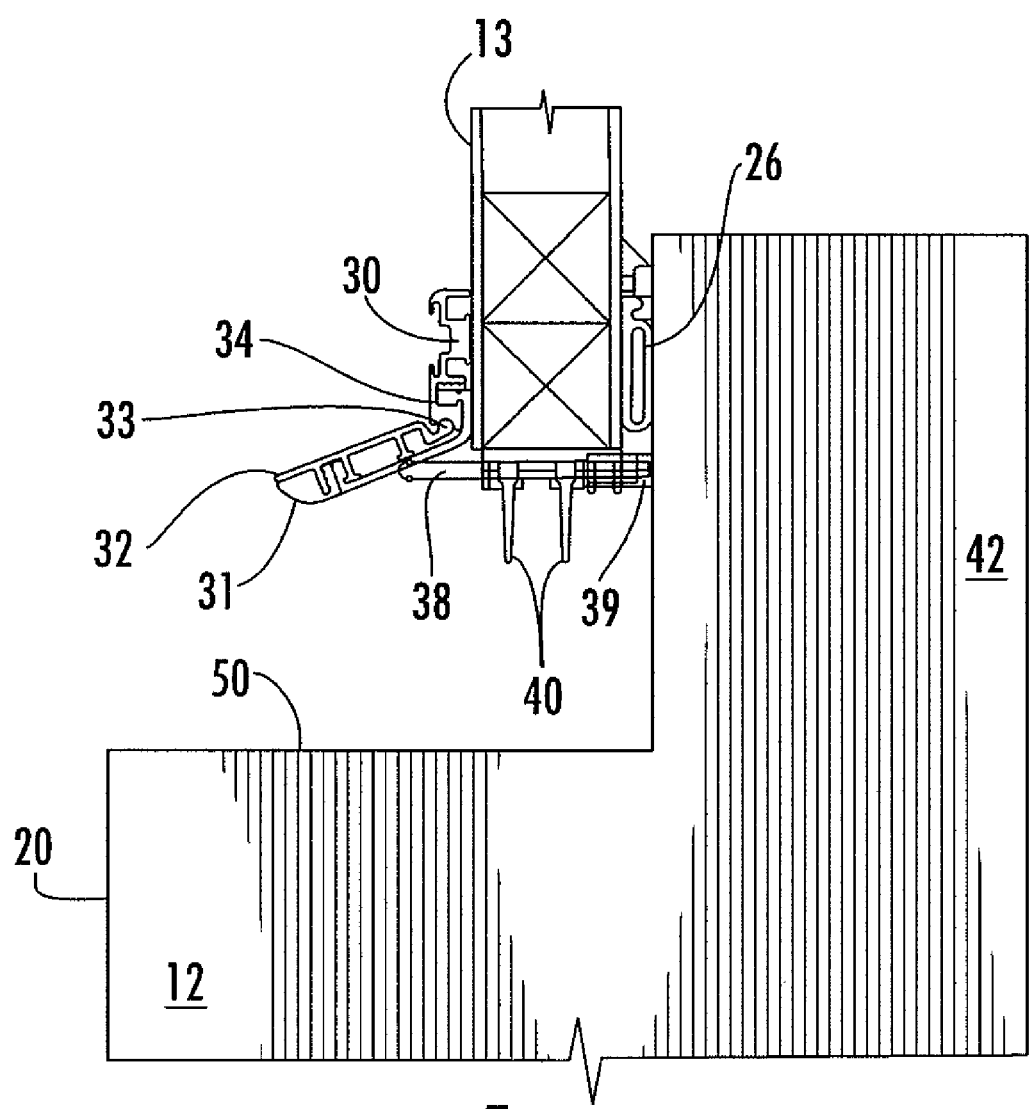
FIG. 5 is a side schematic view showing the expandable room and the apparatus of the present invention wherein the room is in its expanded position and the room is a level-out room.

The assembly may further comprise squeegee members 40, as seen best in FIGS. 3-5. The squeegee members 40 serve as a seal to keep air and moisture out of the interior portions of the room 12 and vehicle 10. In addition to serving as a seal, the squeegee members 40 may assist the lower member 32 in removing the water and other debris from the roof 50 as the room 12 is retracted. As with the lower member 32, a portion of the squeegee members 40 is frictionally engaged with the roof 50 of the expandable room 12 as the room 12 is expanded or retracted to squeegee or push the water and other debris from the roof 50. It should be noted that the lower member 32 usually removes all of the debris from the roof 50 without the help of the squeegee members 40, but the squeegee members 40 serve as a back-up for this purpose.

Figure 6:
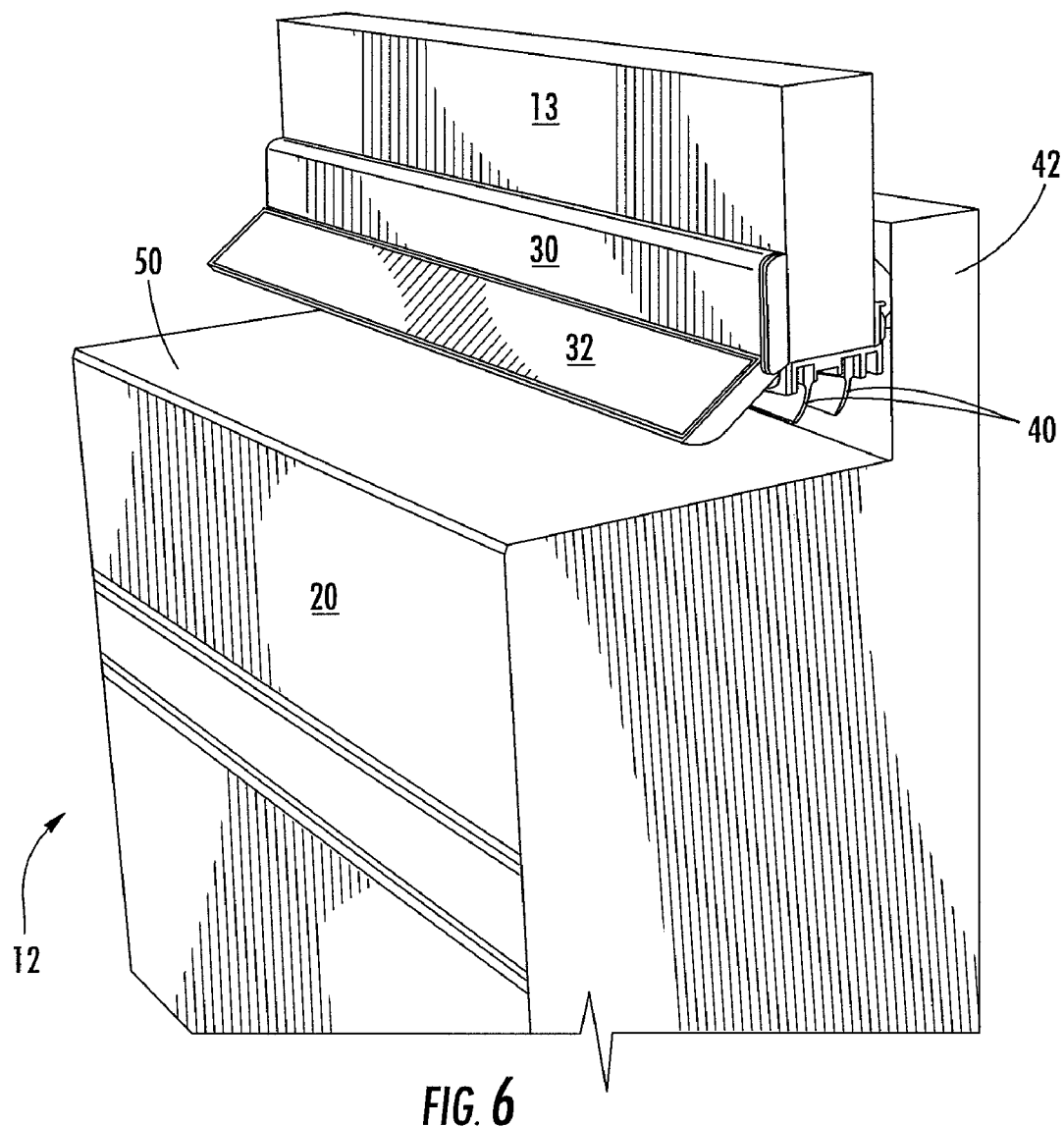
FIG. 6 is a perspective showing the expandable room and the apparatus of the present invention wherein the room is in the expanded position and the room is a level-out room.

FIGS. 5 and 6 show the assembly in its expanded position wherein the recreational vehicle has a "level-out" feature in which the expandable room 12 drops downwardly as it extends so that the floor of the vehicle 10 and the floor of the room 12 are level when the room 12 is fully extended. Level-out expandable rooms are known in the art. As seen in FIGS. 5 and 6, the room 12 has dropped down so that there is some space between the assembly of the present invention and the roof 50 of the expandable room. Before the room 12 returns to its retracted position, the room 12 must be raised so its floor is no longer flush with the vehicle 10 floor. As discussed above, spring 34 urges the upper and lower members 30, 32 to be straight. In order to avoid damage to lower member 32 as the floor of the room 12 is raised, a pin 38 functions to keep lower member 32 extended as room 12 is raised. The pin 38 is preferably slidably combined with the outside wall 13 of the vehicle 10 behind the lower member 32 so that the slidable axis of the pin 38 is perpendicular to the surface of the wall 13. As can be seen by comparing FIG. 3 with FIG. 5, as the room 12 is extended, the room 12 has an upwardly extending room flange 42 that contacts a first end of pin 38 which slides pin 38 longitudinally so that a second end of pin 38 contacts lower member 32 and forces lower member 32 to pivot outwardly relative to upper member 30. Lower member 32 remains held in this extended position by pin 38 until the room 12 is retracted thereby causing flange 42 to no longer be in contact with the pin 38. To illustrate, FIG. 4 shows the room 12 as it is being retracted wherein pin 38 is no longer contacting lower member 32 so that the spring 34 again causes lower member 32 to engage and sweep the roof 50 of the room 12. Preferably, the first end of pin 38 comprises a low friction pad 39 which makes contact with flange 42 of the expandable room 12 to help to prevent pin 38 from damaging the flange 42 as pin 38 makes contact with the flange 42.

Figure 7:
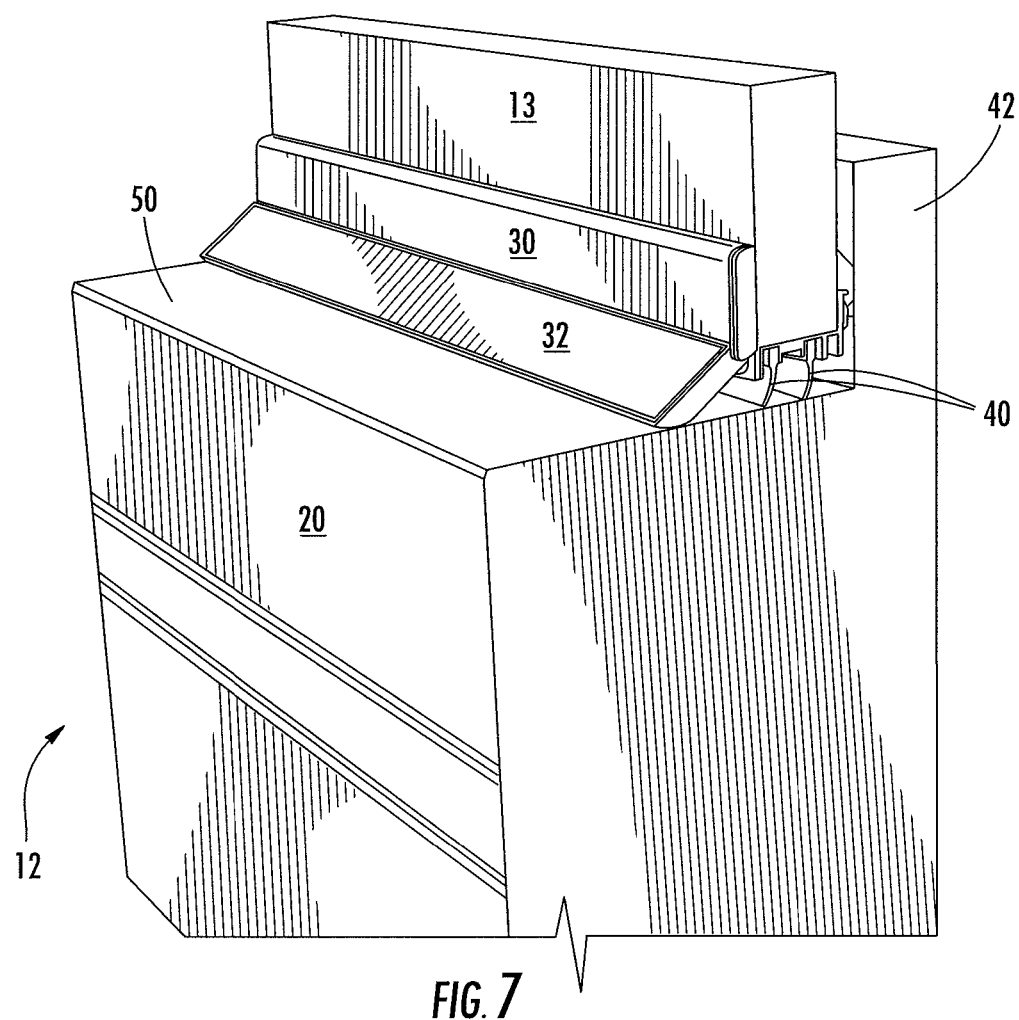
FIG. 7 is a perspective view of the expandable room and the apparatus of the present invention wherein the room is in the expanded position and the room is not a level-out room.

It should be noted that the invention can be used with expandable rooms 12 that do not have a level-out feature. FIG. 7 shows an expandable room in its fully expanded position wherein the expandable room 12 is not a level-out room. In the embodiments that do not contain a level-out room, there is no need for the pin 38 since the room 12 will not drop down and the lower member 32 will not be in danger of being damaged by the room 12 as it is raised to its retracted position.

Having thus described the invention in connection with the preferred embodiments of the invention, it will be evident to those skilled in the art that various revisions and modifications can be made to the specific embodiment described herein without departing from the spirit and scope of the invention. It is our invention, however, that all such revisions and modifications that are obvious to those skilled in the art will be included within the scope of the following claims.

What is claimed is:

1. An assembly for preventing water and other debris from being trapped or crushed between a fixed structure and a moveable structure having a roof, wherein the movable structure moves outwardly from the fixed structure to an extended position and moves inwardly to a retracted position, said assembly comprising:
    a first member combined with the fixed structure; and
    a second member pivotally combined with the first member in a position to be engageable with the roof of the movable structure;
    wherein a portion of the second member contacts the roof of the movable structure as the movable structure is moved from its extended position to its retracted position so as to remove debris therefrom.

2. An assembly for preventing water and other debris from being trapped or crushed between a fixed structure and a moveable structure having a roof, wherein the movable structure moves outwardly from the fixed structure to an extended position and moves inwardly to a retracted position, said assembly comprising:
    a first member combined with the fixed structure; and
    a second member pivotally combined with the first member in a position to be engageable with the roof of the movable structure;
    a spring member combined with the second member, wherein the spring member exerts a force that biases the second member toward the roof causing the second member to frictionally engage the roof as the movable structure is moved from its extended position to its retracted position so as to remove debris therefrom.

3. The assembly of claim 2 wherein the spring member is a rubber element combined with both the first and second members.

4. The assembly of claim 2 wherein the spring member is combined with both the first and second members to help hold the two members together at their pivotal connection.

5. The assembly of claim 1 further comprising at least one squeegee member combined with the fixed structure to frictionally engage the roof of the movable structure to seal out air and moisture.

6. The assembly of claim 1 wherein the second member further comprises a first end and a second end; and
    wherein the second end is rounded so that the second member contacts the roof of the movable structure even though the position of the second member relative to the movable structure changes slightly.

7. The assembly of claim 1 wherein the fixed structure further comprises an outside surface; and
    wherein the first member is combined with the outside surface of the fixed structure.

8. The assembly of claim 1 wherein the fixed structure is a recreational vehicle.

9. The assembly of claim 1 wherein the movable structure is an expandable room of a recreational vehicle.

10. An assembly for preventing water and other debris from being trapped or crushed between a fixed structure and a moveable structure having a roof, wherein the movable structure moves outwardly from the fixed structure to an extended position and moves inwardly to a retracted position, said assembly comprising:
    a first member combined with the fixed structure;
    a second member pivotally combined with the first member along a pivot axis in a position to be engageable with the roof of the movable structure;
    an elongated member having a first end and a second end wherein the elongated member is combined with the fixed structure so that the elongated member is sildable in a direction that is perpendicular to the pivot axis of the first and second member; and
    wherein the second member moves from a first position to a second position as the movable structure is moved from its retracted position to its extended position.

11. The assembly of claim 10 wherein the elongated member is moved from a first position to a second position as the movable structure is moved from its retracted position to its extended position; and
    wherein the elongated member causes the second member to be in its second position when the elongated member is in its second position.

12. The assembly of claim 10 wherein the movable structure further comprises a room flange; and
    wherein the first end of the elongated member engages the room flange as the room is extended which causes the elongated member to slide so that the elongated member second end contacts the second member and causes the second member to be in its second position.

* * * * *